United States Patent [19]

Krämer et al.

[11] Patent Number: 5,069,179
[45] Date of Patent: Dec. 3, 1991

[54] INTERNAL COMBUSTION ENGINE

[75] Inventors: Johann Krämer, Leonberg; Rainer Renz, Stuttgart, both of Fed. Rep. of Germany

[73] Assignee: Mercedes-Benz AG, Fed. Rep. of Germany

[21] Appl. No.: 604,006

[22] Filed: Oct. 25, 1999

[30] Foreign Application Priority Data

Oct. 25, 1989 [DE] Fed. Rep. of Germany ....... 3935497

[51] Int. Cl.$^5$ ............ F02B 19/14; F02B 19/00; C22C 19/00
[52] U.S. Cl. .................... 123/270; 123/280; 420/460
[58] Field of Search ........... 123/269, 270, 273, 280; 420/460

[56] References Cited

U.S. PATENT DOCUMENTS

| | | | |
|---|---|---|---|
| 4,193,379 | 3/1980 | Deitrich et al. | 123/280 X |
| 4,224,902 | 9/1980 | Binder et al. | 123/280 |
| 4,294,209 | 10/1981 | Eisele et al. | 123/269 X |
| 4,725,322 | 2/1988 | Huang et al. | 420/460 X |
| 4,731,221 | 3/1988 | Liu | 420/460 X |
| 4,961,905 | 10/1990 | Law et al. | 420/460 |

FOREIGN PATENT DOCUMENTS

| | | |
|---|---|---|
| 2142951 | 3/1973 | Fed. Rep. of Germany . |
| 2753266 | 5/1979 | Fed. Rep. of Germany ...... 123/280 |
| 0222930 | 5/1985 | Fed. Rep. of Germany . |

OTHER PUBLICATIONS

D. E. Zeitschnift, "Nickel-Bericht" Mar. 1960, pp. 43-46.

*Primary Examiner*—Willis R. Wolfe
*Attorney, Agent, or Firm*—Evenson, Wands, Edwards, Lenahan & McKeown

[57] ABSTRACT

An internal combustion engine is described which comprises a main combustion chamber and a secondary combustion chamber which is arranged in the cylinder head of the internal combustion engine and is connected via a shot channel to the main combustion chamber. To increase the high-temperature stability, the parts of the secondary combustion chamber which are acted upon by the hot gas jet are made of a material of intermetallic phase.

11 Claims, 1 Drawing Sheet

INTERNAL COMBUSTION ENGINE

BACKGROUND OF THE INVENTION

The invention relates to an internal combustion engine comprising a main combustion chamber and a secondary combustion chamber which is arranged in a cylinder head of the internal combustion engine and is connected via a shot channel to the main combustion chamber.

Compression-ignition internal combustion engines, apart from their main combustion chamber, often also have a secondary combustion chamber, such as, for example, a precombustion chamber or a swirl chamber, arranged in the cylinder head. The ignition of the fuel-/air mixture takes place in this secondary combustion chamber, and the hot gas jet resulting in the process passes via a shot channel into the main combustion chamber of the internal combustion engine. In addition, when a precombustion chamber is used as a secondary combustion chamber, a deflecting pin is also arranged in the same, and the secondary combustion chamber, at its end pointing towards the main combustion chamber, has a burner base provided with nozzle openings. Secondary combustion chambers of this type are normally made of a highly heat-resistant material by means of which the high temperatures occurring there can be coped with. Nimonic 80 may be mentioned here as an example of such a material.

A disadvantage of these materials is that they are susceptible to carbonization, that is, carbides develop and the carbon diffuses into the metal and cracks it so that it becomes brittle. Damage can consequently occur at especially stressed points of the secondary combustion chamber. Thus crack formation, for example, appears at the thin webs between the nozzle openings in the burner base. To avoid damage of this type, another material must be used. The use of ceramic materials is conceivable, but they have the disadvantage that they are not ductile enough at room temperature; in other words they cannot be readily processed. Another material is provided by so-called oxide-dispersion superalloys (ODS), which, however, lose their strength at very high temperatures and are also expensive.

In the German journal "Nickel-Berichte", Mar. 1960, No. 3, a nickel-aluminum alloy of $NiAl_3$, solid solution is described as particularly corrosion-resistant at elevated temperatures, which nickel-aluminum alloy therefore appears as an advantageous material for the components described in the invention. However, the solid solutions concern an Al-alloy having a nickel content of, for example, 3–6% by weight. The atoms occupy static places in the lattice structure during the dispersion hardening. The increase, mentioned in the above "Nickel-Berichte", of the high-temperature stability of cast aluminum alloys here relates to the low high-temperature stability of aluminum in general and can raise this, for example, from 200° C. to 300° C.

The materials described in East German Patent Specification 222,930 are also aluminum alloys of solid solutions having a nickel content of 4–10% by weight, to which the above comments apply accordingly.

The materials described here are thus not suitable for use where particular demands are made on the high-temperature stability.

An object of the invention is therefore to make the especially thermally stressed parts of a secondary combustion chamber of an internal combustion engine from a material which has sufficient high-temperature stability with adequate ductility for processing at room temperature and low manufacturing and processing costs.

This object is achieved according to the invention by providing an arrangement wherein at least one of the parts of the secondary combustion chamber which are acted upon by a hot gas jet are made of the material $Ni_3Al$ intermetallic phase. The parts of a secondary combustion chamber arranged in the cylinder head of an internal combustion engine, which parts are especially thermally stressed, such as the shot-channel burner base provided with openings and extending to the main combustion chamber as well as the deflecting pin arranged in the secondary combustion chamber, are made of a material of intermetallic phase, such as, for example, $Ni_3Al$ or $NiAl$. The burner base is here made as a separate part and is subsequently connected, for example welded, to the secondary combustion chamber.

This material $Ni_3Al$ intermetallic phase here consists of about 90% by weight of nickel and about 10% by weight of aluminum, which are cast and cooled in such a way that no dispersion takes place, but a compact material having an ordered lattice structure results. In order to obtain adequate ductility at room temperature, small admixtures of other substances, such as, for example, 0.02% boron or 0.3% yttrium, can be added to the material. The comments just made also apply to the material $NiAl$, whose basic constituents are present in the stoichiometric ratio of 1:1.

Such materials of intermetallic phase have a high-temperature stability in the region of 1000° C., that is, in a region as occurs on highly thermally stressed components of internal combustion engines.

Other objects, advantages and novel features of the present invention will become apparent from the following detailed description of the invention when considered in conjunction with the accompanying drawings.

DETAILED DESCRIPTION OF THE DRAWINGS

Figure 1:
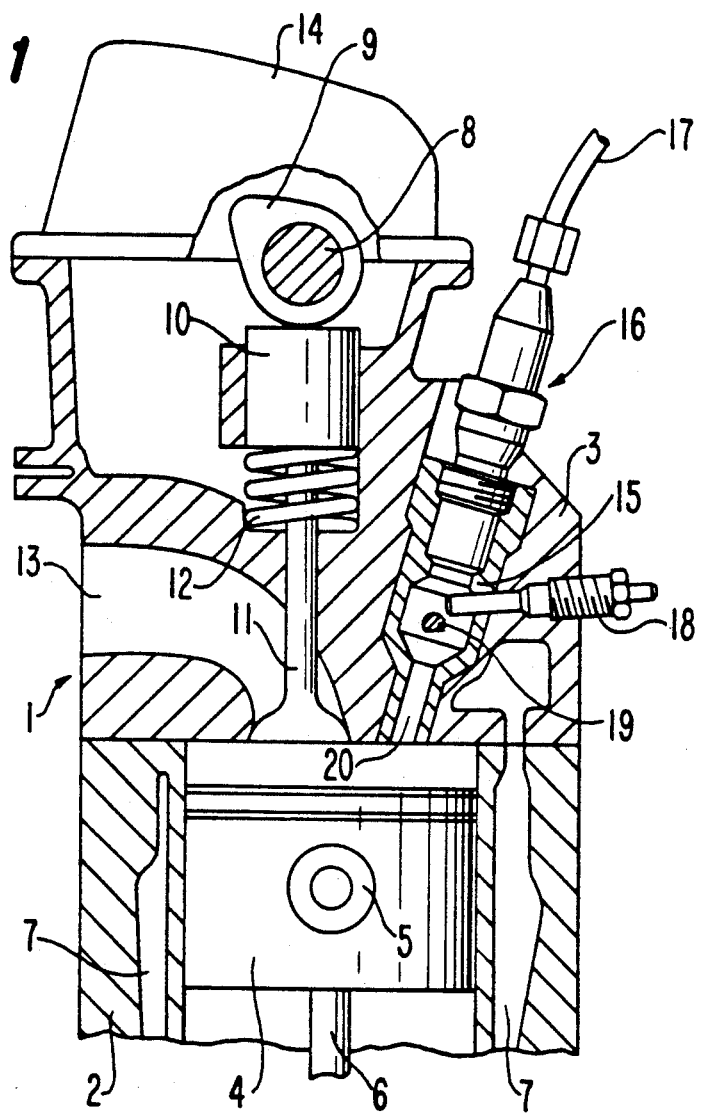
FIG. 1 shows a section through a cylinder of an internal combustion engine having a precombustion chamber in the cylinder head, constructed according to preferred embodiments of the present invention.

An internal combustion engine shown in section and consisting of a cylinder block 2 and a cylinder head 3 is designated by 1 in FIG. 1. The cylinder block 2 contains a piston 4, which is guided in a cylinder and is connected to a crankshaft (not shown here) for the internal combustion engine 1 via a connecting rod 6 linked to its gudgeon pin 5. A water jacket 7 is also provided. Cylinder block 2, cylinder head 3 and piston 4 enclose a main combustion chamber in which the actual combustion takes place. In a known manner, the cylinder head 3 has a camshaft 8 which, via control cams 9 provided on it and bucket tappets 10, opens gas-changing valves 11 against the force of their valve springs 12 and thus permits a gas flow through gas-carrying channels 13. In this arrangement, the cylinder head 3 is closed at the top by a cylinder-head cover 14 fixed to it. In addition, the cylinder head 3 accommodates a secondary combustion chamber 15 which can be inserted into it and which—as shown here—can be a precombustion chamber in which the combustion process is initiated. Via an injection nozzle 16 which is connected to this precombustion chamber 15 and supplied with fuel via a line 17, fuel is injected in a metered manner into this precombustion chamber 15 and ignited there. A glow plug 18 is provided as an ignition aid. In addition, this Figure shows the deflecting pin 19 inserted in the precombustion chamber 15 as well as the shot channel 20 extending from the precombustion chamber 15 to the main combustion chamber.

Figure 2:
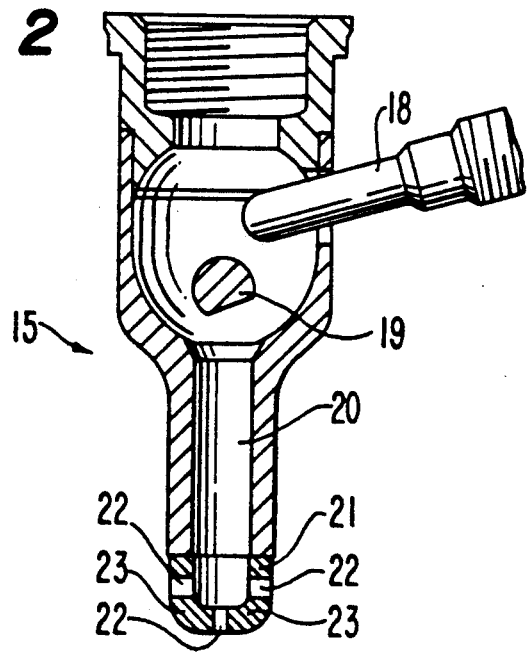
FIG. 2 is a sectional view of the precombustion chamber of the FIG. 1 arrangement.

FIG. 2 is an enlarged representation of the precombustion chamber 15 from FIG. 1 in which the injection nozzle and the other components shown in FIG. 1 are omitted for the sake of clarity. Parts identical to the parts shown in FIG. 1 are provided with the same references numerals. Thus the glow plug 18 projecting into the precombustion chamber 15 and the deflecting pin 19 can be seen. The hot gas jet appearing after the ignition strikes this deflecting pin 19 and passes from there through the shot channel 20 and the nozzle openings 22 arranged in the burner base 21 of the precombustion chamber 15 into the main combustion chamber (not shown here), in which the actual combustion takes place. As can easily be gathered from the Figure, the deflecting pin 19 and the burner base 21 are subjected to high thermal stresses by the hot gas jet. The so called carbonization, that is, carbide formation with diffusion of carbon into the metal of the burner base 21, leads to embrittlement of the material with crack formation following therefrom in the burner base 21 in the webs 23 located between the nozzle openings 22. For this reason, the deflecting pin 19 and the burner base 21 are made of a material of intermetallic phase which has high-temperature stability. The intermetallic phase Ni$_3$Al, which exhibits no carbonization phenomenon, is resistant to oxidation in air and has a good hot-gas corrosion behavior in the gases appearing during operation of the internal combustion engine, proves to be suitable here. An increase in the resistance against corrosion can be achieved by the use of NiAl, which, furthermore, is even lighter. In order to achieve adequate ductility of the material at room temperature, which ductility is desired for the processing, boron can also be added to the material. In this way, the components can be manufactured more simply and more cost-effectively. Thus the deflecting pin 19, for example, can be produced by turning, and the burner base 21 by forging. In addition, the properties of the material permit good weldability so that the burner base 21 can be connected simply and permanently to the precombustion chamber 15 by electron-beam welding or else by brazing. Of course, further elements suitable for optimizing the mechanical properties and the corrosion behavior, such as, for example, hafnium, manganese, iron, tantalum, zirconium, titanium, cobalt, silicon or niobium, can also be added to the material.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of making a secondary combustion chamber for an internal combustion engine of the type comprising a main combustion chamber and a secondary combustion chamber, the secondary combustion chamber being connected via a shot channel to the main combustion chamber, said method including forming at least one of a burner base of the secondary combustion chamber and a deflection pin arranged in the secondary combustion chamber, which are acted upon in use by a hot gas jet, of the material Ni$_3$Al intermetallic phase.

2. Method according to claim 1, wherein the burner base is welded to an adjacent structure of the secondary combustion chamber.

3. Internal combustion engine comprising a main combustion chamber and a secondary combustion chamber which is arranged in a cylinder head of the internal combustion engine and is connected via a shot channel to the main combustion chamber, wherein at least one of a burner base of the secondary combustion chamber and a deflecting pin arranged in the secondary combustion chamber, which are acted upon by a hot gas jet, are made of the material Ni$_3$Al intermetallic phase.

4. Internal combustion engine according to claim 1, wherein a deflecting pin arranged in the secondary combustion chamber is made of the material Ni$_3$Al intermetallic phase.

5. Internal combustion engine according to claim 1, wherein the burner base is welded to an adjacent structure of the secondary combustion chamber.

6. Internal combustion engine comprising a main combustion chamber and a secondary combustion chamber which is arranged in the cylinder head of the internal combustion engine and is connected via a shot channel to the main combustion chamber, wherein at least one of a burner base of the secondary combustion chamber and a deflecting pin arranged in the secondary combustion chamber, which are acted upon by a hot gas jet, are made of the material NiAl intermetallic phase.

7. Internal combustion engine according to claim 6, wherein a deflecting pin arranged in the secondary combustion chamber is made of the material NiAl intermetallic phase.

8. Internal combustion engine according to claim 6, wherein the burner base is welded to the secondary combustion chamber.

9. Method of making a secondary combustion chamber for an internal combustion engine of the type comprising a main combustion chamber and a secondary combustion chamber, the secondary combustion chamber being connected via a shot channel to the main combustion chamber, said method including forming at least one of a burner base of the secondary combustion chamber and a deflection pin arranged in the secondary combustion chamber, which are acted upon in use by a hot gas jet, of the material NiAl intermetallic phase.

10. Method according to claim 9, wherein a deflecting pin arranged in the secondary combustion chamber is made of the material NiAl intermetallic phase.

11. Method according to claim 9, wherein the burner base is welded to the secondary combustion chamber.

* * * * *